United States Patent
Schouten et al.

(10) Patent No.: US 11,994,645 B2
(45) Date of Patent: May 28, 2024

(54) APPARATUS, SYSTEM AND METHOD REGARDING BOREHOLE MUON DETECTOR FOR MUON RADIOGRAPHY AND TOMOGRAPHY

(71) Applicant: IDEON TECHNOLOGIES INC., Richmond (CA)

(72) Inventors: Douglas William Schouten, Surrey (CA); Jacobus Van Nieuwkoop, Rosedale (CA)

(73) Assignee: Ideon Technologies Inc., Richmond (CA)

(*) Notice: Subject to any disclaimer, the term of this patent is extended or adjusted under 35 U.S.C. 154(b) by 27 days.

(21) Appl. No.: 17/614,478

(22) PCT Filed: May 26, 2020

(86) PCT No.: PCT/CA2020/050716
§ 371 (c)(1),
(2) Date: Nov. 26, 2021

(87) PCT Pub. No.: WO2020/237369
PCT Pub. Date: Dec. 3, 2020

(65) Prior Publication Data
US 2022/0229205 A1    Jul. 21, 2022

Related U.S. Application Data

(60) Provisional application No. 62/853,148, filed on May 27, 2019.

(51) Int. Cl.
*G01T 1/20* (2006.01)
*G01V 5/04* (2006.01)

(52) U.S. Cl.
CPC .............. *G01V 5/04* (2013.01); *G01T 1/201* (2013.01); *G01T 1/2018* (2013.01); *G01T 1/20184* (2020.05); *G01T 1/20185* (2020.05)

(58) Field of Classification Search
CPC ............ G01V 5/04; G01T 1/16; G01T 1/1603; G01T 1/1606; G01T 1/20; G01T 1/2002;
(Continued)

(56) References Cited

U.S. PATENT DOCUMENTS 3,656,019 A    4/1972 Stowe
4,504,438 A    3/1985 Levy et al.
(Continued)

FOREIGN PATENT DOCUMENTS

JP    2015075334    4/2015
WO    2009002602 A2    12/2008
(Continued)

OTHER PUBLICATIONS

M. Basset et al., "MGR: An innovative, low-cost and compact cosmic-ray detector", Nuclear Instruments and Methods in Physics Research A 567 (2006) 298-301.
(Continued)

*Primary Examiner* — Allen C. Ho
(74) *Attorney, Agent, or Firm* — Todd A. Rattray; Oyen Wiggs Green & Mutala LLP (57) ABSTRACT

A borehole muon detector for detecting and characterizing a geographic region of interest is provided, the borehole muon detector comprising a housing and sensor, which is housed in the housing, the sensor including: a plurality of photodetector elements; at least one printed circuit board in electrical communication with the plurality of photodetectors and including an integrated electronic circuit for tracking time; a first helical bundle of scintillator fibers; an oppositely wound helical bundle of scintillator fibers, the oppositely wound helical bundle, the first helical bundle and the opposite helical bundle defining an outer cylinder, which includes a first end and a second end and a bore therebetween, each scintillator fiber of each bundle directly opti-
(Continued)

cally connected to a photodetector element at least at one end and indirectly optically connected to the photodetector element at no more than one end; and a plurality of scintillator bars, each comprising a first end, a second end and an optical fiber extending from the first end to the second end, the plurality of scintillator bars vertically disposed in the bore of the outer cylinder, each optical fiber of the scintillator bar optically directly connected to a photodetector element at least at one end and indirectly optically connected to the photodetector at no more than one end.

21 Claims, 6 Drawing Sheets

(58) Field of Classification Search
CPC ..... G01T 1/2006; G01T 1/2008; G01T 1/201; G01T 1/2018; G01T 1/20182; G01T 1/20183; G01T 1/20184; G01T 1/20185; G01T 1/20186; G01T 1/20187; G01T 1/20188; G01T 1/29; G01T 1/2907; G01T 1/2914; G01T 1/2921; G01T 1/2928
USPC .......................................... 250/253, 254, 265
See application file for complete search history.

(56) References Cited

U.S. PATENT DOCUMENTS

| | | | |
|---|---|---|---|
| 6,909,098 B2 * | 6/2005 | Bross .................. | G01T 1/16 250/367 |
| 7,488,934 B2 | 2/2009 | Bryman | |
| 7,531,791 B2 * | 5/2009 | Bryman ............... | G01T 1/203 250/266 |
| 7,863,571 B2 | 1/2011 | Beken | |
| 8,017,906 B2 * | 9/2011 | Nelson ................. | G01T 1/2008 250/252.1 |
| 8,288,721 B2 | 10/2012 | Morris et al. | |
| 8,384,017 B2 | 2/2013 | Botto | |
| 8,604,440 B2 * | 12/2013 | Frisch .................. | G01T 1/363 250/367 |
| 8,881,808 B2 | 11/2014 | Dorffer et al. | |
| 9,482,763 B2 * | 11/2016 | Vasilyev .............. | G01V 5/125 |
| 9,841,511 B2 * | 12/2017 | Saenger ............... | G01V 5/04 |
| 9,851,311 B2 | 12/2017 | Sossong et al. | |
| 10,067,261 B2 * | 9/2018 | Hu ....................... | G01V 5/04 |
| 10,191,180 B2 | 1/2019 | Yaish et al. | |
| 10,274,610 B2 * | 4/2019 | Nelson ................. | G01T 1/2002 |
| 10,451,745 B1 * | 10/2019 | Bonal ................... | G01T 5/00 |
| 10,585,208 B1 * | 3/2020 | Yaish ................... | G01T 1/205 |
| 10,598,799 B1 * | 3/2020 | Berlin .................. | G01T 5/02 |
| 2008/0128604 A1 | 6/2008 | Bryman | |
| 2010/0270462 A1 | 10/2010 | Nelson et al. | |
| 2011/0035151 A1 | 2/2011 | Botto | |
| 2014/0319365 A1 | 10/2014 | Sossong et al. | |
| 2020/0018863 A1 | 1/2020 | Bonal et al. | |

FOREIGN PATENT DOCUMENTS

| | | | | |
|---|---|---|---|---|
| WO | | 2011041750 A1 | 4/2011 | |
| WO | WO 2013/155075 A1 * | | 10/2013 | ............... G01T 1/20 |
| WO | | 2016145105 A1 | 9/2016 | |
| WO | | 2021046602 A1 | 3/2021 | |
| WO | | 2021102399 A1 | 5/2021 | |
| WO | | 2021237288 A1 | 12/2021 | |

OTHER PUBLICATIONS

R. Schwitters et al., "A Detector for Muon Tomography" (Jun. 2004).
C. Hui, "Maya Muon Tomography Muon Tracking, and Muon Simulation", The University of Texas at Austin (Aug. 2007).
R. C. Ruchti. "The Use of Scintillating Fibers for Charged-Particle Tracking", Annu. Rev. Nucl. Part. Sci. 1996. 46:281-319 (1996).
The UT Maya Muon Project "Proposal to Build a Prototype Detector for Underground Cosmic Ray Muons" (Jan. 2004).
K. Nagamine et. al, "Method of probing inner-structure of geophysical substance with the horizontal cosmic-ray muons and possible application to volcanic eruption prediction", Nuclear Instruments and Methods in Physics Research A 3.56 (1995) 585-595.
Menichelli et al., "A scintillating fibres tracker detector for archaeological applications", Nuclear Instruments & Methods in Physics Research. Section A, Elsevier BV * North-Holland, NL, vol. 572, No. 1, Feb. 15, 2007, pp. 262-265, XP005890366.
Eric T Wright, "A detector for muon tomography: Data acquisition and preliminary results", May 1, 2007, XP055289981.
International Search Report for PCT/CA2020/050454—Muon Tomography System, Apparatus, and Method for Tunnel Detection.
Written Opinion for PCT/CA2020/050454—Muon Tomography System, Apparatus, and Method for Tunnel Detection.
Harel et al., "Lingacom muography". Philos Trans A Math Phys Eng Sci., Jan. 28, 2019 (Jan. 28, 2019), vol. 377 (2137), pp. 1-7.
International Search Report for PCT/CA2020/000036—Drift Tube Borehole Muon Detector System, Apparatus, and Method for Muon Radiography and Tomography.
Written Opinion for PCT/CA2020/000036—Drift Tube Borehole Muon Detector System, Apparatus, and Method for Muon Radiography and Tomography.
M.C. Fouz, "The CMS muon detectors," 2007 IEEE Nuclear Science Symposium Conference Record, pp. 1885-1890. (Year: 2007).
Hildebrandt M: "The low-mass drift chamber system of the MEG experiment", Nuclear Science Symposium and Medical Imaging Conference (NSS/MIC), 2011 IEEE, IEEE, Oct. 23, 2011 (Oct. 23, 2011), pp. 1757-1760, XP032121939, ISSN: 1082-3654, DOI: 10.1109/NSSMIC.2011.6154677 ISBN: 978-1-4673-0118-3.
Lorenzo Bonechi et al: "Atmospheric muons as an imaging tool", arxiv.org, Cornell University Library, 201 Olin Library Cornell University Ithaca, NY 14853, Jun. 10, 2019 (Jun. 10, 2019), XP081375254.

* cited by examiner

APPARATUS, SYSTEM AND METHOD REGARDING BOREHOLE MUON DETECTOR FOR MUON RADIOGRAPHY AND TOMOGRAPHY

FIELD

This technology relates generally to tracking cosmic ray muons through an underground sensor in order to develop an image of subsurface density above the sensor (muon radiography), and to use multiple sensors to build a 3D model of density (muon tomography).

BACKGROUND

Exploitation of underground resources, for example, but not limited to mineral deposits and oil reservoirs, employs varied geophysical methods to detect, image, and monitor underground regions of interest. Many of the devices and systems used are large.

There are numerous designs of borehole detectors. For example, U.S. Pat. No. 8,881,808 discloses a method of determining a value indicative of fracture quality with a neutron-gamma tool. At least some of the illustrative embodiments are methods including: obtaining or measuring gas saturation of a formation to create a value indicative of pre-fracture gas saturation; and after a fracturing process measuring gas saturation of the formation to create a value indicative of post-fracture gas saturation; and creating a value indicative of fracture quality based on the value indicative of pre-fracture gas saturation and the value indicative of post-fracture gas saturation. The neutron-gamma tool is a borehole device but does not rely on muon detection. Production of gamma rays is inherently dangerous to human health.

Another method is based on a technique known as muon radiography. Muons are elementary particles produced in high energy nuclear interactions that are initiated by cosmic rays in the upper atmosphere. The muons travel at nearly the speed of light and, depending on their energy, can penetrate deep into the earth. The rate at which the muons lose energy in matter is dependent on the properties of the medium, and in particular on the density of matter. Many of the muon detectors are used in industrial and manufacturing settings. For example, U.S. Pat. No. 10,191,180 discloses a detector assembly that includes an insulating substrate, a printed circuit board, a resistive plate, a drilled board, a drift volume, and a cathode. A surface of the printed circuit board exposed to the resistive plate includes printed circuit lines for measuring first and second coordinates of a charge event. A mechanical assembly applies a force between the insulating substrate and the resistive a plate to form an electrical contact between the printed circuit lines on the printed circuit board and the resistive plate without the use of an electrical adhesive. This is a large-scale detector and would not be suitable for boreholes nor would it be suitable for interrogating geographic voids and regions of reduced or enhanced density.

U.S. Pat. No. 9,851,311 discloses methods, system and devices for inspecting materials in a vehicle or object. In one aspect, a system for muon tomography detection includes a first and second housing structure each including a first array and second array of muon detection sensors, respectively, the first housing structure positioned opposite the second at a fixed height to form a detection region to contain a target object, in which the muon detection sensors measure positions and directions of muons passing through the first array to the detection region and passing from the detection region through the second array; support structures to position the first housing structure at the fixed height; and a processing unit to receive data from the muon detection sensors and analyze scattering behaviors of the muons in materials of the target object to obtain a tomographic profile or spatial distribution of scattering centers within the detection region. These detectors would not be suitable for boreholes nor would they be suitable for interrogating geographic voids and regions of reduced or enhanced density.

U.S. Pat. No. 7,863,571 discloses an economical position-sensing muon detector for muon radiography that is constructed using a pair of glass plates spaced apart by crossed parallel barriers. Smaller detector wires are interspersed between the barriers and an ionizing gas is used to fill the space between the plates. A muon striking near where detector wires cross causes a local momentary current flow. The current flow in two of the detector wires is sensed to determine the coordinates of the muon impact. Such muon detectors can be assembled in modular surface arrays and such arrays can be positioned on spatial surfaces for differential inspection and detection of muons transiting through and emanating from objects placed within the inspection space. Such a detector constitutes a novel and useful invention in providing an inspection device and means for cargo or cargo vehicles that detects muons transiting through and emanating from hazardous materials intended to cause malicious harm. This detector would not be suitable for boreholes and would not be suitable for interrogating geographic voids and regions of reduced or enhanced density.

Those directed to detection of geographic features include U.S. Pat. No. 8,384,017, which discloses methods and related systems for use for making subterranean nuclear measurements. The system can include a plurality of elongated scintillator members each generating optical signals in response to ionizing radiation. Optical detector units can be optically coupled to at least one end of each elongated scintillator member so as to detect optical signals from each elongated scintillator member. The system can be suitable for permanent or semi-permanent deployment downhole. For example, the system can operate for more than six months in a subterranean deployment measuring cosmic radiation. The system can be suited to monitor density changes in subterranean regions of interest, for example, density changes brought about by steam injection as part of a steam assisted gravity drainage operation. This system uses an optical detector at each end of a bundle of scintillator fibers. This approach leads to cross talk and unnecessarily increases the complexity of the system.

U.S. Pat. No. 7,488,934 discloses a system configured for detecting cosmic ray muon (CRM) flux along a variety of trajectories through a subterranean test region, collecting the muon detection data and processing the data to form a three-dimensional density distribution image corresponding to the test region. The system may be used for identifying concentrations of high (or low) density mineral deposits or other geological structures or formations well below the earth's (or ocean floor) surface. The system may be utilized for imaging geological materials and structures of higher and/or lower density in a test region having a depth of several kilometers or more.

Malmqvist et al (Geophysics Vo. 44 No. 9 pp 1549-1569) discloses the use of a muon detector for determining rock density. The detector has two scintillator plates with an absorber plate between them and a coincident circuit to count the muons as they pass through the plates.

Drell et al (http://www.hep.utexas.edu/mayamuon/information.html https://repositories.lib.utexas.edu/handle/2152/39757) discloses the uses of a muon detector based on the scintillator system from Fermilab (Pla-Dalmau, Bross, and Mellott, "Low-Cost Extruded Plastic Scintillator") for use in studying pyramids. The muon detector has scintillator strips with wavelength-shifting (WLS) optical fiber located in a groove extruded along a face of the scintillator strips. The WLS fiber re-emits the absorbed scintillator light at a slightly different wavelength; this light is transmitted both directions in the fiber with relatively low loss to photomultipliers (PMTs) at each end. Drell et al arranges the scintillator strips on three adjacent layers. On the two outer layers, the strips form helices of pitch angle ±30° relative to the axis; on the inner layer strips are oriented parallel to the detector axis. The stereo layers make "one-half wrap" around the cylinder from one end to the other.

Basset et al (Nuclear Instruments and Methods in Physics Research A 567 (2006) 298-301) discloses a muon detector that has three coaxial PVC cylinders covered with straight scintillating bars or with 2 mm diameter scintillating optical fibers positioned along a clockwise coil on the middle cylinder (158 fibers) and along a counterclockwise coil on the external cylinder (178 fibers). All the scintillating elements are covered to avoid light leak: the bars are covered with mylar sheets and the fibers with Teflon Tape®. There are six photomultiplier tubes, one for each end of each cylinder, hence the probability of cross talk is high.

What is needed is a borehole muon detector that is inexpensive to construct, is highly sensitive, is accurate and consumes very little power. It would be preferable if it includes both scintillator fibers and scintillator bars, the latter including a wave-length shifting optical fiber. It would be still more preferable if there was a one to one relationship between at least one end of the wave-length shifting optical fibers and photodetectors. It would be more preferable if there was a one to one relationship between at least one end of the scintillator fibers and the photodetectors. It would be more preferable if there was a first helical bundle of scintillator fibers that define a bore in which the scintillator bars are housed

SUMMARY

The present technology is a borehole muon detector that is inexpensive to construct, is highly sensitive, is accurate and consumes very little power. All embodiments include both scintillator fibers and scintillator bars, with the scintillator bars including a wave-length shifting optical fiber. At least one end of each scintillator bar is optically connected to a photodetector via the optical fiber. There is a one to one relationship between at least one end of the scintillator fibers and the photodetectors. There is a first helical bundle of scintillator fibers that define a bore in which the scintillator bars are housed. There is also an oppositely wound helical bundle of scintillator fibers that, with the first helical bundle define the bore in which the scintillator bars are housed.

In one embodiment a borehole muon detector for detecting and characterizing geographic regions of interest is provided, the borehole muon detector comprising a housing and sensor, which is housed in the housing, the sensor including: a plurality of photodetector elements; at least one printed circuit board in electrical communication with the plurality of photodetectors; a first helical bundle of scintillator fibers; an oppositely wound helical bundle of scintillator fibers, the oppositely wound helical bundle and the first helical bundle defining an outer cylinder, which includes a first end and a second end and a bore therebetween, each scintillator fiber of each bundle directly optically connected to a photodetector element at least at one end and indirectly optically connected to a photodetector element at no more than one mirrored end; and a plurality of scintillator bars, which are vertically disposed in the bore, each comprising a first end, a second end and an optical fiber extending from the first end to the second end, each optical fiber of the scintillator bar optically directly connected to a photodetector element at least at one end and indirectly optically connected to the photodetector at no more than one mirrored end.

In the borehole muon detector, the first helical bundle may comprise at least one winding.

In the borehole muon detector, the optical fiber may be a wave-length shifting optical fiber.

In the borehole muon detector, the plurality of scintillator bars may define an inner cylinder with a bore therethrough.

In the borehole muon detector, each scintillator bar may have a triangular cross section which includes a base and two sides.

In the borehole muon detector, the plurality of scintillator bars may include a plurality of first scintillator bars and a plurality of second scintillator bars, and the triangular cross section of the first scintillator bars may be larger than the triangular cross section of the second scintillator bars.

In the borehole muon detector, the first scintillator bars may alternate with the second scintillator bars, the bases of the first scintillator bars may face the outer cylinder and the bases of the second scintillator bars may face the inner bore.

In the borehole muon detector, each scintillator bar may include a bore in which the wave-length shifting (WLS) optical fiber is housed.

In the borehole muon detector, each scintillator fiber of each bundle may be directly optically connected to a photodetector element at each end.

In the borehole muon detector each wave-length shifting optical fiber may be directed optically connected to a photodetector element at each end of the scintillator bars.

In another embodiment a borehole muon detector for detecting and characterizing geographic regions of interest is provided, the borehole muon detector comprising a housing and a sensor, which is housed in the housing, the sensor including: a plurality of first photodetector elements; at least one first printed circuit board in electronic communication with the plurality of first photodetector elements, the first printed circuit board including an integrated electronic circuit for tracking time; at least a second printed circuit board in electrical communication with the plurality of second photodetector elements, the second printed circuit board including an integrated electronic circuit for tracking time; a helical bundle of scintillator fibers the helical bundle comprising n windings, where n is greater than zero and is not an integer, each scintillator fiber directly optically connected to a photodetector element at each end, the helical bundle defining an outer cylinder, which includes a bore therethrough; and a plurality of scintillator bars, each comprising a first end and a second end and an optical fiber extending from the first end to the second end, the plurality of scintillator bars vertically disposed in the outer cylinder to define an inner cylinder with a bore therethrough, each optical fiber of each scintillator bar optically directly connected to a photodetector element at least at one end and indirectly optically connected to the photodetector at no more than one end.

In the borehole muon detector, n may be greater than one.

In the borehole muon detector, the scintillator bars may have a triangular cross section which includes a base and two sides.

In the borehole muon detector, the plurality of scintillator bars may include a plurality of first scintillator bars and a plurality of second scintillator bars, and the triangular cross section of the first scintillator bars may be larger than the triangular cross section of the second scintillator bars.

In the borehole muon detector, the first scintillator bars may alternate with the second scintillator bars, the bases of the first scintillator bars may face the outer cylinder and the bases of the second scintillator bars may face the inner bore.

In the borehole muon detector, the optical fibers of the scintillator bars may be wave-length shifting (WLS) optical fibers.

The borehole muon detector may further comprise an oppositely wound helical bundle of scintillator fibers, the oppositely wound helical bundle comprising n windings, wherein n is greater than zero and is not an integer.

In the borehole muon detector, the oppositely wound helical bundle may comprise at least one winding.

In another embodiment, a borehole muon detector for detecting and characterizing a geographic region of interest is provided, the borehole muon detector comprising a housing and sensor, which is housed in the housing, the sensor including: a plurality of photodetector elements; a printed circuit board in electrical communication with the plurality of photodetectors; a plurality of scintillator fibers, each including a first end and a second end, the first end and the second end of each scintillator fiber each optically connected to a photodetector element, the plurality of scintillator fibers arranged as a helical bundle of scintillator fibers, the helical bundle comprising n windings, where n is greater than zero and is not an integer; and a plurality of scintillator bars, each comprising a first end, a second end and an optical fiber extending from the first end to the second end, the plurality of scintillator bars vertically disposed in the bore of the outer cylinder, each optical fiber of the scintillator bar optically directly connected to a photodetector element at least at one end and indirectly optically connected to the photodetector at no more than one end.

In the borehole muon detector, one end of each optical fiber in the scintillator bars may include a reflective layer.

In the borehole muon detector, both ends of each optical fiber in the scintillator bars may be optically connected to a photodetector element.

In yet another embodiment, a method of detecting and characterizing a geographic regions of interest is provided, the method comprising: inserting a muon detector into a borehole, the muon detector including a housing and a sensor, the sensor including at least one helical bundle of scintillator fibers to define a bore, a plurality of scintillator bars disposed along a length of the bore, a plurality of photodetector elements optically connected to the plurality of scintillator fibers and the optical fibers of the plurality of scintillator bars and a printed circuit board electrically connected to the plurality of photodetector elements; in response to a plurality of muons traversing the helical bundle and scintillator bars, the scintillator fibers and scintillator bars that have been traversed generating an optical signal which is detected by photodetector elements; the printed circuit board receiving a plurality of electrical signals from the photodetector elements; and the printed circuit board processing the electrical signals to determine a location of the geographic regions of interest.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Photodetector element—in the context of the present technology, a photodetector element may be a channel in a multichannel device or may be a device.

Optically connected—in the context of the present invention, optically connected may be direct or indirect. Indirect is via a mirror or mirrored surface or reflective surface. If there are photodetectors at each end of the optical fiber, each end is directly connected. If there is one photodetector at one end of the optical fiber and a mirror or mirrored surface or reflective surface at the other end, the other end is indirectly optically connected.

Detailed Description

Figure 1:
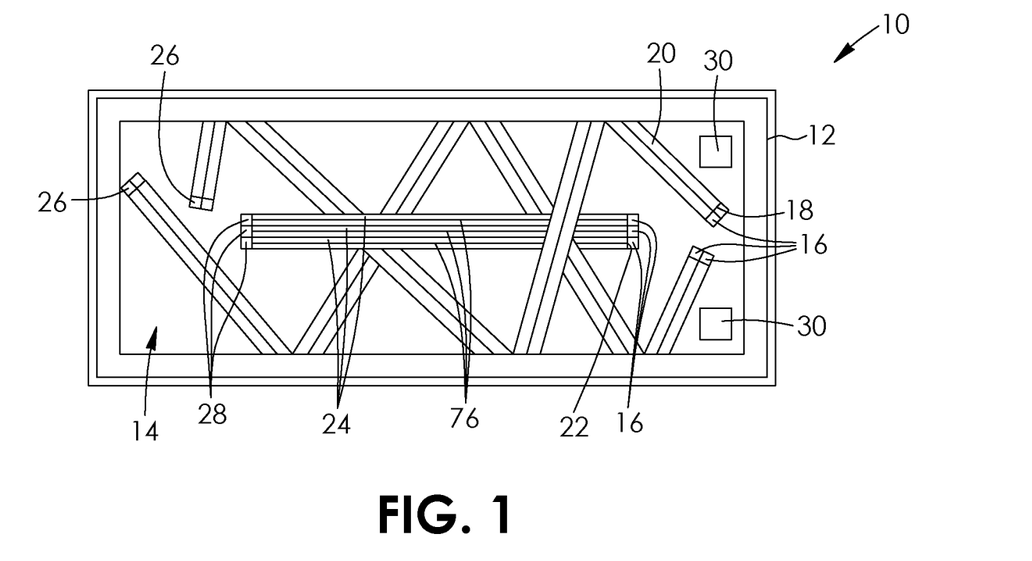
FIG. 1 is a schematic of an embodiment of a muon detector.

In an embodiment shown in FIG. 1 (which may be a borehole muon detector for use in a borehole), a muon detector, generally referred to as 10 has a housing 12 and a muon sensor, generally referred to as 14, which is housed in the housing 12. The muon sensor 14 includes photodetector elements 16 which are attached to the one end 18 of scintillator fibers 20 and one end 22 of wave-length shifting optical fibers 76 that are embedded in scintillator bars 24, in a one to one relationship—one photodetector element 16 to one end 18, 22. The other end 26 of the scintillator fibers 20 is mirrored as is the other end 28 of the wave-length shifting optical fiber 76 in the scintillator bars 24. Each photodetector element 16 is preferably a single device and is not part of a multichannel photodetector. One or more printed circuit boards (PCBs) 30 are electrically connected to the photodetector elements 16. The PCBs 30 contains amplifiers, clocks, and/or field programmable gate array(s) (FPGA's), and/or application specific integrated circuit(s) (ASIC's), and/or analog to digital converter(s) (ADC's) that allow signals from the photodetector elements 16 to be digitally analyzed, to determine light yield from the scintillator bars 24 and which of the scintillator fibers 20 emitted scintillation light, and which photodetector elements 16 detected light within a user-specified period of time that may be consistent with the time it takes for a muon to pass through the muon detector 10 and for scintillation light to be produced, propagated to photodetector elements 16 and detected. The photodetector readouts for the scintillator bars 24 and the scintillator fibers 20 along with auxiliary information such as a global timestamp, comprises the data that is stored or sent to a backend processor+ memory for further processing for each candidate muon event. If the data are stored it is periodically retrieved (either by being pushed, or being pulled, over a data network) by an offline system consisting of a processor and memory for further processing. The further processing runs an algorithm to carry out the methodology to determine the muon trajectory for candidate muon events and to ignore candidate events that may not be consistent with the passage of a muon through the muon detector 10.

Figure 2:
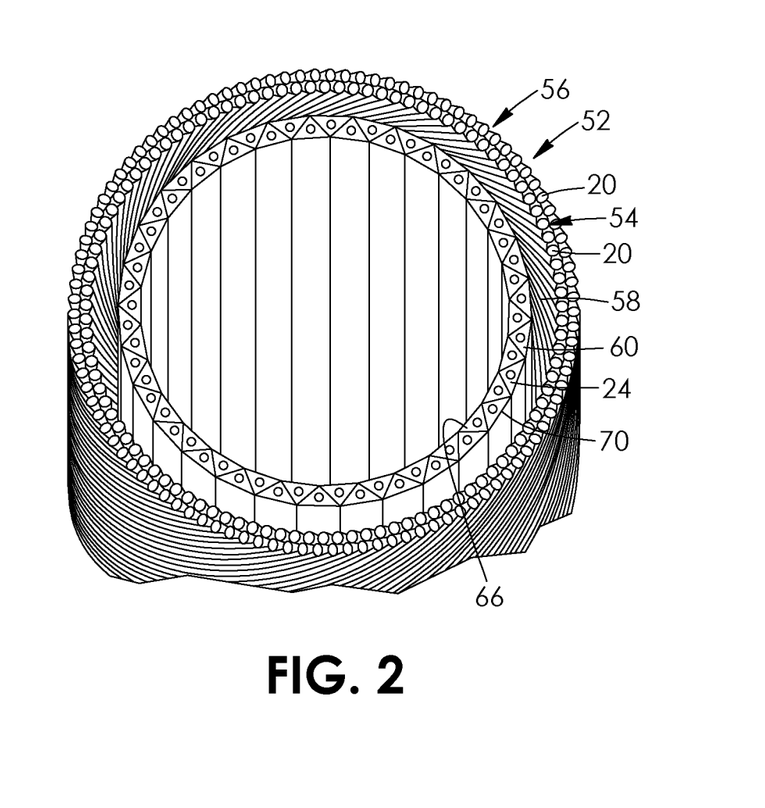
FIG. 2 is a schematic of the scintillator fibers and scintillator bars of the muon detector of FIG. 1.

The details of the arrangement of the scintillator fibers 20 and scintillator bars 24 are shown in FIG. 2. There is a first helical bundle, generally referred to as 52, of scintillator fibers 20, which has m clockwise windings along the length, where m is greater than zero and is ideally not an integer value. In one embodiment m is greater than one. The second helical bundle 54 has n counter-clockwise windings along the length, where n is ideally not an integer value and is greater than zero. In one embodiment, n is greater than one. The first helical bundle 52 and the second helical bundle 54 are mounted on a mandrel to form an outer cylinder, generally referred to as 56. The bundles 52, 54 are wound around the mandrel m and n times. m and n are judiciously chosen such that no two of all of the overlaps of any one fiber from the bundle 52 and any one fiber from the bundle 54 occur along a vertically oriented line of the outer cylinder 56. The outer cylinder 56 has a bore 58. Housed in the bore 58, is an inner cylinder 60 of vertically disposed scintillator bars 24. The inner side 66 of the inner cylinder 60 faces a bore and the outer side 70 of the inner cylinder 60 faces the outer cylinder 56.

Figure 3:
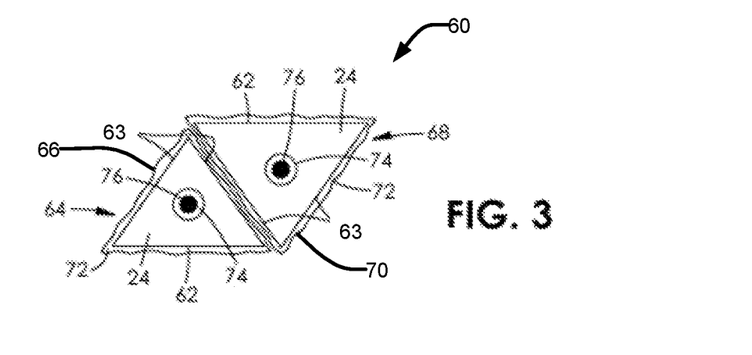
FIG. 3 is a schematic of a cross section of two scintillator bars.

As shown in FIG. 3, there are two sizes of scintillator bars 24, both of which have a triangular cross section with two sides 63 and a base 62. The smaller cross section scintillator bars 64 are on the inner side 66 of the inner cylinder 60 and the larger cross section scintillator bars 68 are on the outer side 70 of the inner cylinder 60 (See FIG. 2). The base 62 of the larger cross section scintillator bars 68 faces the outer cylinder 56 and the base 62 of the smaller cross section scintillator bars 64 face the inner bore 70 of the inner cylinder 60. This provides for a smooth, regular circular shape. The scintillator bars 64, 68 are coated with a reflective coating 72 and have a central bore 74 which houses the wave-length shifting optical fiber 76.

In an alternative embodiment, the wave-length shifting optical fiber is replaced with an optical fiber.

Figure 4:
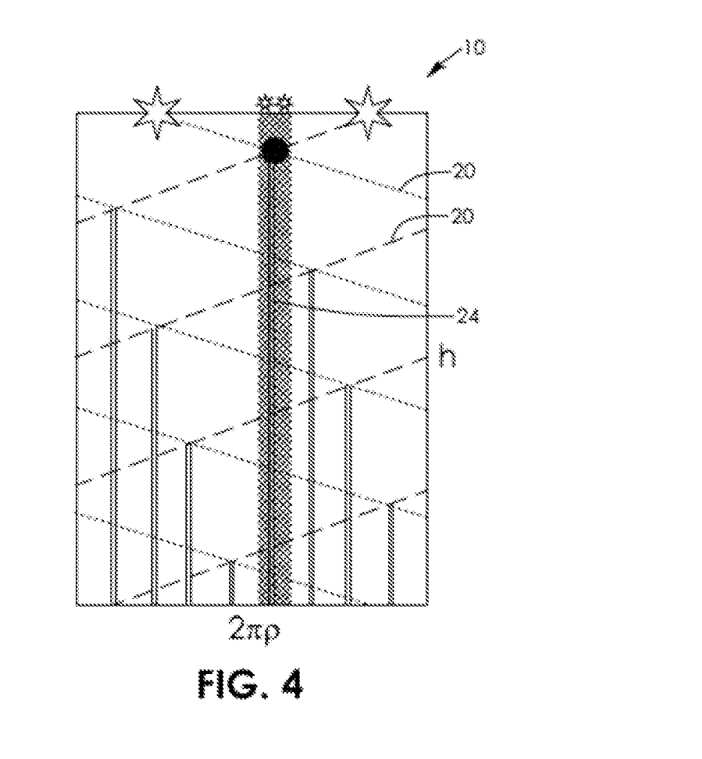
FIG. 4 is a schematic of two exemplary scintillator fibers and exemplary scintillator bars describing the scintillation light from a muon passing through an "unrolled" muon detector.

FIG. 4 shows a simplified schematic of the muon detector 10 as a muon strikes. The horizontal width is $2\pi\rho$ where $\rho$ is the radius of the apparatus, and the vertical height is h, the height of the apparatus. In this schematic only two scintillator fibers 20 are shown, one from each of the counter-wound helical bundles 52, 54. The lines representing the fibers 20 are dashes and dots to distinguish which bundle they are in. In this case, m=4 and n=5. There is an (m+n)-fold ambiguity of crossing positions where a muon could have crossed through in order to create scintillation light in both fibers (the scintillation light is indicated by the star icons, and is measured by photo-detectors on only one side of any fiber). These (m+n) possible locations are indicated by the double lines. The additional inner layer of vertically disposed extruded scintillators 24 with embedded WLS fibers performs an additional measurement. Multiple light yield measurements from this layer (shown by the small star icons), taken from one side of each of the segmented, coated bars, can be used to calculate a barycenter where the muon passed through. This provides an additional measurement with associated uncertainty indicated by the gradient band. If the uncertainty is narrower than the characteristic pitch between the (m+n) possible solutions, then the actual position at which the muon hit one side of the cylindrical system (the black dot) is uniquely determined.

Without being bound to theory, since any muon must pass through at least two adjacent bars (or a single bar if the muon passes exactly through the apex of the triangle) in order to pass through the cylinder, then by measuring the relative light yield between adjacent bars the position through which the muon passed in the (x-y) plane can be interpolated to very good precision. The advantages of the design are:

1. Extruded scintillator bars are very inexpensive and the resolution of the measurement in the x-y plane for the azimuthal coordinate can be done very precisely; this precision allows for superior precision on the z measurement.
2. Instrumentation only needs to be done on one side of the system; only one side of each scintillator element needs to be coupled to a photodetector.

3. No fast timing with picosecond resolution needs to be performed; therefore, simpler and less expensive scintillators and simple and less expensive electronics can be utilized.

Method

A muon crossing through the outer cylinder 56 will intersect with at least one scintillator fiber 20 in each helical bundle 52, 54 upon entering the outer cylinder 56 and will cross through at least one scintillator fiber 20 in each helical bundle 52, 54 upon exiting. For a muon crossing event, scintillation light will be created in four scintillator fibers 20 [FO1, FO2, FI1 and FI2(I=inner O=outer)], and possibly more depending on the angle at which the muon impinges on the outer cylinder 56.

The time it takes for the muon to cross the outer cylinder 56 can be as short as 0.15 nanoseconds. Given the time jitter in the evolution of the scintillation light in the scintillator fibers 20 it is not possible to associate the scintillation light measured at one end of each scintillator fiber 20 with the entry or exit of the muon as it passes through the detector.

The counter-wound helical bundles 52, 54 create crossing points wherein a muon will pass through scintillator fiber pairs, each pair consisting of one scintillator fiber 20 from the inner helical bundle 54 and one scintillator fiber 20 from the outer helical bundle 54. There will be two possible combinations FI1/FO1, FI2/FO2 and FI1/FO2, FI2/FO1. If the inner and outer helical bundles 52, 54 wrap around the outer cylinder 56 m and n times (not necessarily an integer, and not necessarily >1) respectively then for each pair of scintillator fibers 20 FIX and FOY there will be M+N points at which the fibers cross over each other, where M=floor(m) and N=floor(n), if M and N have no common factors. Thus, there are 2×(M+N) possible points along the surface of the outer cylinder 56 at which a muon may have crossed through either on entry or exit. Each of these points will be at a unique azimuthal position.

In addition, the muon will cross through at least four (total) scintillator bars 24 in entry and exit. Only events are recorded for offline processing where scintillation light is measured from scintillator bars 24 that are separated by some number of scintillator bars 24, to ensure that a muon crosses through all layers of the system.

By Birk's law, the amount of scintillation light (photons) emitted by a muon as it passes through a scintillator bar 24 is related approximately linearly to the path length through the scintillator bar 24. This allows the muon position to be determined with precision far better than the pitch of the scintillator bars 24 in the inner cylinder 60, by interpolating the position at which the muon passed through neighbouring scintillator bars 24 the inner cylinder 60.

The inner cylinder 60 thus allows two azimuth points to be measured, corresponding to either entry or exit. These azimuth points are determined with precision finer than the minimum separation of candidate entry or exit positions determined from the counter-wound helical bundles 52, 54. Thus, exactly two of the 2×(M+N) candidate points are selected corresponding to either entry or exit. These candidate points also determine a longitudinal position along the inner cylinder 60 for entry or exit.

With two longitudinal positions, a zenith angle with respect to vertical can be determined for the muon trajectory. There are two possible combinations for entry and exit. The combination that is consistent with muons arriving from the surface of the earth (opposed to the solution that has muons passing from the far side of the earth) is chosen. Thus, a measurement of the muon azimuth and zenith angles is performed.

In an alternative embodiment, the second or other end 26 of the scintillator fibers 20 and the other end 28 of the wave-length shifting optical fiber 76 in the scintillator bars 24 are not mirrored and instead, are attached to a photodetector element 16 as described above (in a one on one relation). The photodetector elements 16 are electrically connected to the PCB 30 as described above.

In another alternative embodiment, the second or other end 26 of the scintillator fibers 20 are not mirrored and instead, are attached to a photodetector element 16 as described above (in a one to one relation). The other end 28 of the wave-length shifting optical fiber 76 in the scintillator bars are mirrored. The photodetector elements 16 are electrically connected to the PCB 30 as described above.

In yet another embodiment, the second or other end 26 of the scintillator fibers 20 are mirrored. The other end 28 of the wave-length shifting optical fiber 76 in the scintillator bars are attached to a photodetector element 16 as described above. The photodetector elements 16 are electrically connected to the PCB 30 as described above. Still further embodiments include photodetectors at both ends of the scintillator fibers and photodetectors at only one end of the wave-length shifting optical fibers and photodetectors at both ends of the wave-length shifting optical fibers and photodetectors at only one end of the scintillator fibers.

Figure 5:
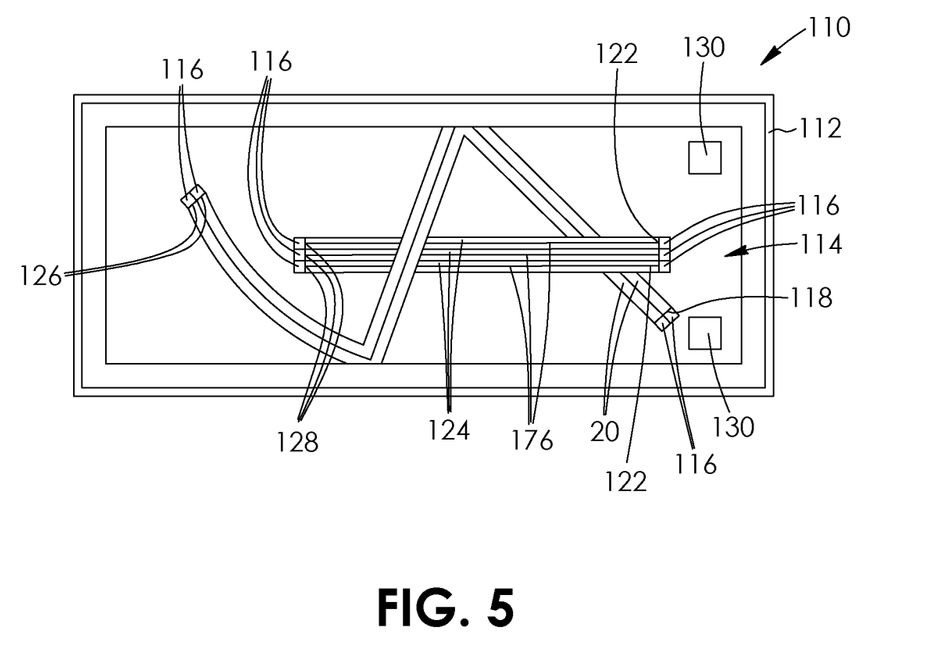
FIG. 5 is a schematic of an alternative muon detector.

In yet another embodiment, shown in FIG. 5, a muon detector (which may be a borehole muon detector for use in a borehole), generally referred to as 110 has a housing 112 and a muon sensor, generally referred to as 114, which is housed in the housing 112. The muon sensor 114 includes photodetector elements 116 which are attached to the one end 118 of scintillator fibers 120 and one end 122 of the wave-length shifting optical fiber 176 that are embedded in the scintillator bars 124, in a one to one relationship—one photodetector element 116 to one end 118, 122. The second or other end 126 of the scintillator fibers 120 and the second or other end 128 of the wave-length shifting optical fiber 176 in the scintillator bars 124 are also attached to a photodetector element 116 in a one on one relation. A photodetector element 116 is preferably a single device and is not a channel in a multichannel device. At least one printed circuit board (PCB) 130 is electrically connected to the photodetector elements 116. The PCB 130 contains amplifiers, clocks, and/or field programmable gate array(s) (FPGA's), and/or application specific integrated circuit(s) (ASIC's), and/or analog to digital converter(s) (ADC's) that allow signals from the photodetector elements 116 to be digitally analyzed, to determine light yield from the scintillator bars 124 and which of the scintillator fibers 120 emitted scintillation light along with the relative detection time of the light at the first and second end of those respective scintillator fibers 120, and which photodetector elements 116 detected light within a user-specified period of time that may be consistent with the time it takes for a muon to pass through the muon detector 110 and for scintillation light to be produced, propagated to photodetector elements 116 and detected. The photodetector readouts for the scintillator bars 124 and the scintillator fibers 120 along with auxiliary information such as a global timestamp, comprises the data that is stored or sent to a backend processor+ memory for further processing for each candidate muon event. If the data are stored it is periodically retrieved (either by being pushed, or being pulled, over a data network) by an offline system consisting of a processor and memory for further processing. In any case, the further processing runs an algorithm to carry out the methodology to determine the muon trajectory for candidate muon events and to ignore candidate events that may not be consistent with the passage of a muon through the muon detector 10.

Figure 6:
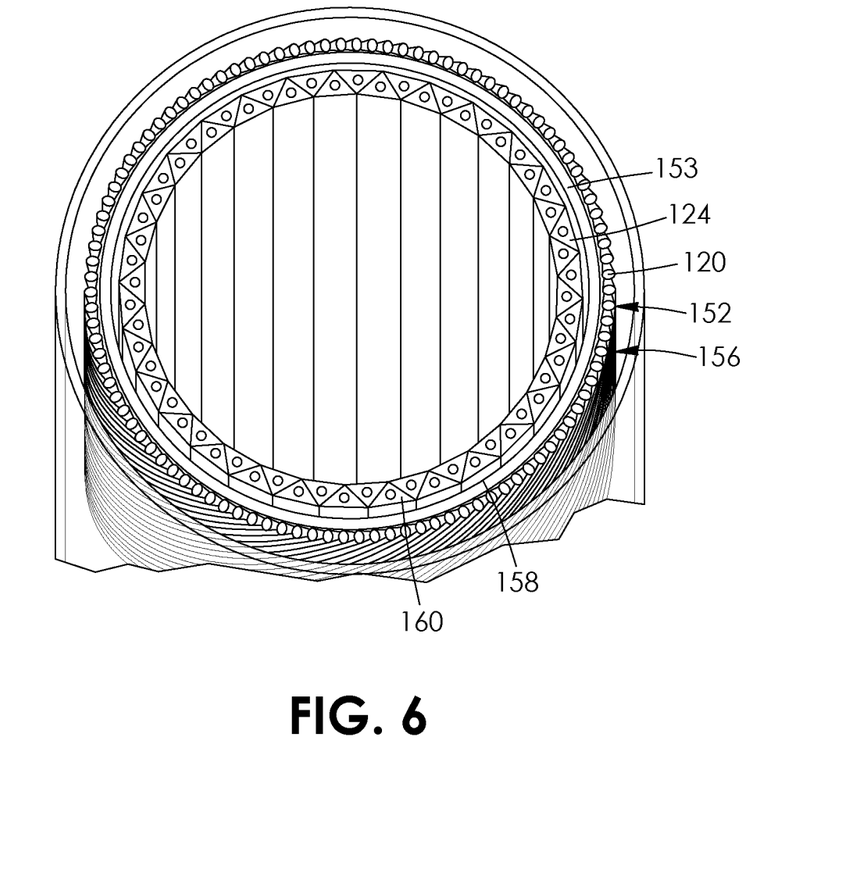
FIG. 6 is a schematic of the scintillator fibers and scintillator bars of the alternative muon detector.

In the preferred embodiment, one end 122 or the other end 128 of each wave-length shifting optical fiber 176 is mirrored and is not attached to photodetector elements 116. Photodetector elements 116 are attached to the opposite end 122 or 128 of the wave-length shifting optical fiber 176 that are embedded in the scintillator bars 124. The photodetector elements 116 are electrically connected to the PCB 130 as described above The details of the arrangement of the scintillator fibers 120 and scintillator bars 124 is shown in FIG. 6. There is a helical bundle, generally referred to as 152, of scintillator fibers 120. The helical bundle 152 has n clockwise or counter-clockwise windings. In one embodiment, n is greater than one. The helical bundle 152 is mounted on a mandrel 153 to form an outer cylinder, generally referred to as 156. The outer cylinder 156 has a bore 158. Housed in the bore 158, is an inner cylinder 160 of vertically disposed scintillator bars 124. The scintillator bars 124 and their arrangement is exactly as shown in FIG. 3.

Figure 7:
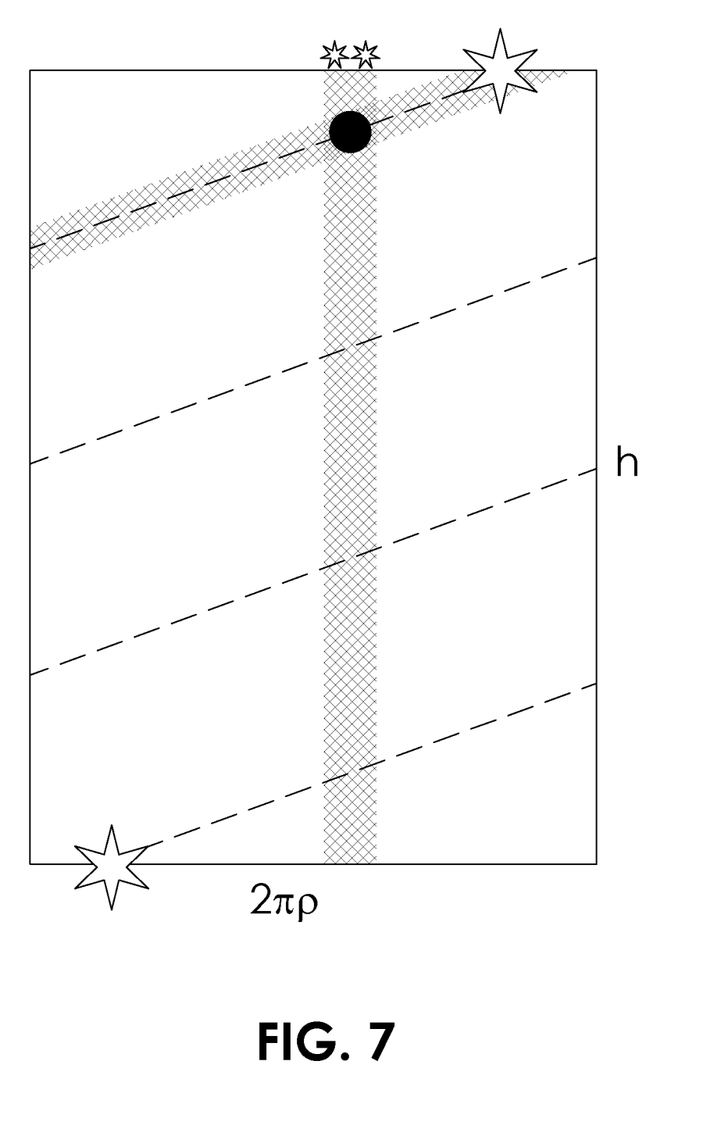
FIG. 7 shows a simplified schematic of the muon detector 10 as a muon strikes.

FIG. 7 shows a simplified schematic of the muon detector 10 as a muon strikes. Only one scintillation fiber 120 is shown. If the scintillation fiber 120 has n windings, there is an N-fold ambiguity (where N=floor(n)) of crossing positions where a muon could have crossed through in order to create scintillation light in the scintillation fiber 120 and within the resolution of the azimuthal position determined by the inner cylinder 160 of triangle scintillator bars 124 (shown by the vertical gray band). Again, the scintillation light is indicated by the star icons. In order to resolve the N-fold ambiguity, the relative arrival time of scintillation light at the photodetectors 116 on either end 118, 126 of the scintillation fiber 120 is used. Using this information, an estimate for the position along the whole helical length of the scintillation fiber 120 where the scintillation occurred can be attained (shown by the diagonal gray band). If the uncertainty on this estimate is smaller than the distance along the helical length between any of the N-fold candidate locations, then the actual position at which the muon hit one side of the outer cylinder 156 is uniquely determined. In the layer of extruded scintillator bars 124 with embedded WLS fibers 76, multiple light yield measurements (shown by the small star icons), taken from one side of each of the coated scintillation bars 124, are used to calculate a barycenter where the muon passed through.

Method

Assuming only F1 and F2 scintillator fibers 120 are struck by a muon (and there could be more), the determination of the azimuth for entry and exit of the muon using the inner layer of inscribed n-gon of scintillator bars 124 proceeds in the same way as described in relation to FIG. 4. The azimuth position determines two vertical bands B1 and B2 within which the entry and exit of the muon occurred. There are multiple intersections of F1 and F2 with both bands, N points for F1 & B1 and F1 & B2 and N points for F2 & B1 and F2 & B2. By measuring the difference in the arrival & detection time of light at both ends of either F1 or F2, it is possible to estimate the approximate position along F1 and F2 where the muon-initiated scintillation. This determines unique combinations of all possible intersection points of F1 and F2 with the vertical bands B1 & B2. With such a determination a trajectory is determined up to a 180 degree ambiguity in azimuth corresponding to the assignment of entry and exit. The assignment of entry and exit is chosen to be consistent with muons arriving from the surface and not from the far side of the earth.

Figure 8A:
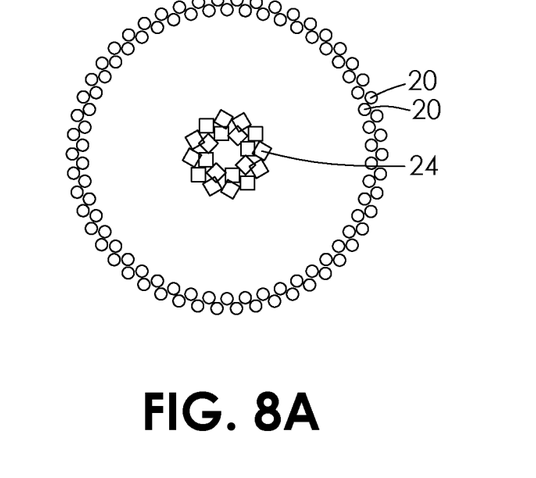
FIG. 8A is a schematic of an alternative embodiment of FIG. 2.
Figure 8B:
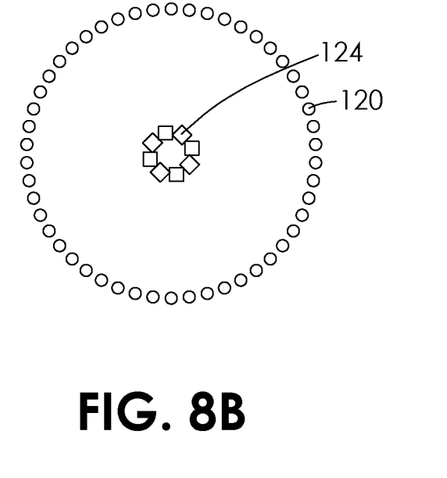
FIG. 8B is a schematic of an alternative embodiment of FIG. 5.

As shown in FIGS. 8A and B in another embodiment, the inner cylinders 60, 160 are replaced with a bundle of scintillator bars 24, 124.

Figure 9A:
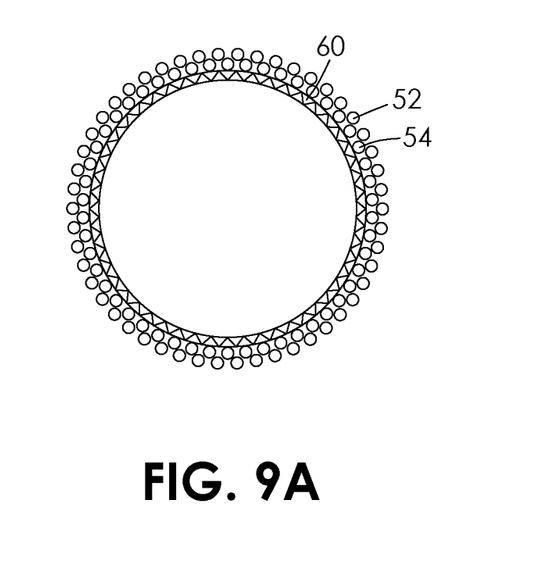
FIG. 9A is a schematic of an alternative embodiment of FIG. 2.
Figure 9B:
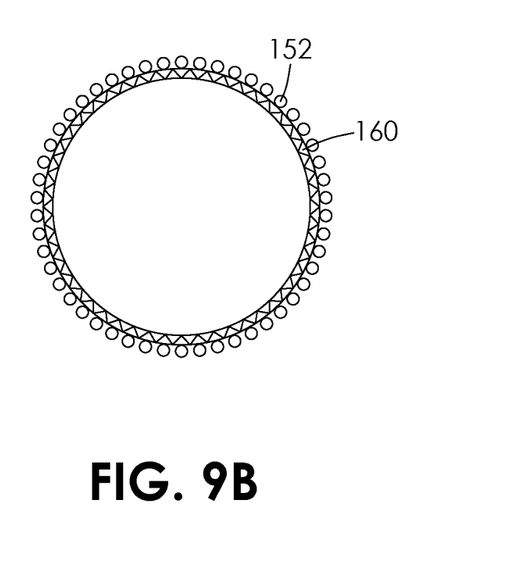
FIG. 9B is a schematic of an alternative embodiment of FIG. 5.

As shown in FIGS. 9A and B in another alternative embodiment, the helical bundles 52, 54, 152 are wound around the inner cylinders 60, 160.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A borehole muon detector for detecting and characterizing a geographic region of interest, the borehole muon detector comprising:
 a housing; and
 a sensor, which is housed in the housing, the sensor including:
  a plurality of photodetector elements;
  at least one printed circuit board in an electrical communication with the plurality of photodetector elements and including an integrated electronic circuit for tracking time;
  a first helical bundle of scintillator fibers;
  an oppositely wound helical bundle of scintillator fibers, the oppositely wound helical bundle of scintillator fibers and the first helical bundle of scintillator fibers defining an outer cylinder, which includes a first end, a second end, and a bore therebetween, each scintillator fiber of the first helical bundle of scintillator fibers and the oppositely wound helical bundle of scintillator fibers directly optically connected to a photodetector element of the plurality of photodetector elements at least at one end and indirectly optically connected to the photodetector element of the plurality of photodetector elements at no more than one end; and
  a plurality of scintillator bars, each scintillator bar of the plurality of scintillator bars comprising a first end, a second end, and an optical fiber extending from the first end to the second end, the plurality of scintillator bars vertically disposed in the bore of the outer cylinder, the optical fiber of each scintillator bar of the plurality of scintillator bars optically directly connected to a photodetector element of the plurality of photodetector elements at least at one end and indirectly optically connected to the photodetector element of the plurality of photodetector elements at no more than one end.

2. The borehole muon detector of claim 1, wherein the first helical bundle of scintillator fibers comprises at least one winding.

3. The borehole muon detector of claim 1 or 2, wherein the optical fiber of each scintillator bar comprises a wavelength shifting optical fiber.

4. The borehole muon detector of claim 3, wherein the plurality of scintillator bars define an inner cylinder having an inner bore therethrough.

5. The borehole muon detector of claim 4, wherein each scintillator bar of the plurality of scintillator bars has a triangular cross section, which includes a base and two sides.

6. The borehole muon detector of claim 5, wherein the plurality of scintillator bars includes a plurality of first scintillator bars and a plurality of second scintillator bars, and the triangular cross section of each scintillator bar of the plurality of first scintillator bars is larger than the triangular cross section of each scintillator bar of the plurality of second scintillator bars.

7. The borehole muon detector of claim 6, wherein the plurality of first scintillator bars alternates with the plurality of second scintillator bars, and the base of each scintillator bar of the plurality of first scintillator bars faces the outer cylinder, and the base of each scintillator bar of the plurality of second scintillator bars faces the inner bore.

8. The borehole muon detector of any one of claims 3 to 7, wherein the optical fiber of each scintillator bar of the plurality of scintillator bars includes a bore in which the wave-length shifting optical fiber is housed.

9. The borehole muon detector of any one of claims 3 to 8, wherein each scintillator fiber of the first helical bundle of scintillator fibers and the oppositely wound helical bundle of scintillator fibers is directly optically connected to a photodetector element of the plurality of photodetector elements at each end.

10. The borehole muon detector of any one of claims 3 to 9, wherein the wave-length shifting optical fiber of each scintillator bar is directly optically connected to a photodetector element of the plurality of photodetector elements at each end of the plurality of scintillator bars.

11. A borehole muon detector for detecting and characterizing a geographic region of interest, the borehole muon detector comprising:
   a housing; and
   a sensor, which is housed in the housing, the sensor including:
      a plurality of first photodetector elements;
      a plurality of second photodetector elements;
      at least one first printed circuit board in an electrical communication with the plurality of first photodetector elements, the at least one first printed circuit board including an integrated electronic circuit for tracking time;
      at least one second printed circuit board in an electrical communication with the plurality of second photodetector elements, the at least one second printed circuit board including an integrated electronic circuit for tracking time;
      a helical bundle of scintillator fibers comprising n windings,
      where n is greater than zero and is not an integer, each fiber of the helical bundle of scintillator fibers directly optically connected to a photodetector element from among the plurality of first photodetector elements and the plurality of second photodetector elements at each end, the helical bundle of scintillator fibers defining an outer cylinder, which includes a bore therethrough; and
      a plurality of scintillator bars, each scintillator bar of the plurality of scintillator bars comprising a first end, a second end, and an optical fiber extending from the first end to the second end, the plurality of scintillator bars vertically disposed in the outer cylinder to define an inner cylinder having an inner bore therethrough, the optical fiber of each scintillator bar of the plurality of scintillator bars optically directly connected to a photodetector element from among the plurality of first photodetector elements and the plurality of second photodetector elements at least at one end and indirectly optically connected to the photodetector element from among the plurality of first photodetector elements and the plurality of second photodetector elements at no more than one end.

12. The borehole muon detector of claim 11, wherein the optical fiber of each scintillator bar comprises a wave-shifting optical fiber.

13. The borehole muon detector of claim 11 or 12, wherein n is greater than one.

14. The borehole muon detector of any one of claims 11 to 13, wherein each scintillator bar of the plurality of scintillator bars has a triangular cross section, which includes a base and two sides.

15. The borehole muon detector of claim 14, wherein the plurality of scintillator bars includes a plurality of first scintillator bars and a plurality of second scintillator bars, and the triangular cross section of each scintillator bar of the plurality of first scintillator bars is larger than the triangular cross section of each scintillator bar of the plurality of second scintillator bars.

16. The borehole muon detector of claim 15, wherein the plurality of first scintillator bars alternates with the plurality of second scintillator bars, and the base of each scintillator bar of the plurality of first scintillator bars faces the outer cylinder, and the base of each scintillator bar of the plurality of second scintillator bars faces the inner bore.

17. The borehole muon detector of any one of claims 11 to 16, further comprising an oppositely wound helical bundle of scintillator fibers.

18. A borehole muon detector for detecting and characterizing a geographic region of interest, the borehole muon detector comprising:
   a housing; and
   a sensor, which is housed in the housing, the sensor including:
      a plurality of photodetector elements;
      a printed circuit board is an electrical communication with the plurality of photodetector elements;
      a plurality of scintillator fibers, each scintillator fiber of the plurality of scintillator fibers including a first end and a second end, the first end and the second end of each scintillator fiber optically connected to a photodetector element of the plurality of photodetector elements, the plurality of scintillator fibers arranged as a helical bundle of scintillator fibers defining an outer cylinder, which includes a bore therethrough, the helical bundle of scintillator fibers comprising n windings, where n is greater than zero and is not an integer; and
      a plurality of scintillator bars, each scintillator bar of the plurality of scintillator bars comprising a first end, a second end, and an optical fiber extending from the first end to the second end, the plurality of scintillator bars vertically disposed in the bore of the outer cylinder, the optical fiber of each scintillator bar of the plurality of scintillator bars optically directly connected to a photodetector element of the plurality of photodetector elements at least at one end and indirectly optically connected to the photodetector element of the plurality of photodetector elements at no more than one end.

19. The borehole muon detector of claim 18, wherein one end of each optical fiber of each scintillator bar of the plurality of scintillator bars includes a reflective layer.

20. The borehole muon detector of claim 18, wherein both ends of each scintillator bar of the plurality of scintillator bars are optically connected to a photodetector element of the plurality of photodetector elements.

21. A method of detecting and characterizing a geographic region of interest, the method comprising:
   inserting a muon detector into a borehole, the muon detector including a housing and a sensor, the sensor including:
      at least one helical bundle of scintillator fibers to define a bore,
      a plurality of scintillator bars disposed along a length of the bore,
      a plurality of optical fibers, each optical fiber of the plurality of optical fibers extending along a length of a corresponding scintillator bar from among the plurality of scintillator bars,
      a plurality of photodetector elements optically connected to the at least one helical bundle of scintillator fibers and to the plurality of optical fibers, and
      a printed circuit board electrically connected to the plurality of photodetector elements; and
   in response to a plurality of muons traversing the at least one helical bundle of scintillator fibers and the plurality of scintillator bars:
      generating an optical signal from the at least one helical bundle of scintillator fibers and the plurality of scintillator bars that have been traversed by the plurality of muons;
      detecting, by the plurality of photodetector elements, the optical signal from the at least one helical bundle of scintillator fibers and the plurality of scintillator bars that have been traversed by the plurality of muons;
      receiving, at the printed circuit board, a plurality of electrical signals from the plurality of photodetector elements; and
      processing the plurality of electrical signals with the printed circuit board to determine a location of the geographic region of interest.

* * * * *